US011323618B2

(12) United States Patent
Raproeger et al.

(10) Patent No.: US 11,323,618 B2
(45) Date of Patent: May 3, 2022

(54) METHOD FOR DISPLAYING A MODEL OF A SURROUNDING AREA, CONTROL UNIT AND VEHICLE

(71) Applicant: Robert Bosch GmbH, Stuttgart (DE)

(72) Inventors: Dirk Raproeger, Wunstorf (DE); Lidia Rosario Torres Lopez, Hildesheim (DE); Paul Robert Herzog, Hildesheim (DE); Paul-Sebastian Lauer, Hannover (DE); Uwe Brosch, Hohenhameln (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 17/260,047

(22) PCT Filed: Jun. 19, 2019

(86) PCT No.: PCT/EP2019/066165
§ 371 (c)(1),
(2) Date: Jan. 13, 2021

(87) PCT Pub. No.: WO2020/043342
PCT Pub. Date: Mar. 5, 2020

(65) Prior Publication Data
US 2021/0321038 A1 Oct. 14, 2021

(30) Foreign Application Priority Data
Aug. 29, 2018 (DE) .......................... 102018214602.0

(51) Int. Cl.
*H04N 5/232* (2006.01)
*G06T 7/55* (2017.01)
(Continued)

(52) U.S. Cl.
CPC .......... *H04N 5/23238* (2013.01); *B60R 1/00* (2013.01); *G06T 7/55* (2017.01); *G06T 7/90* (2017.01);
(Continued)

(58) Field of Classification Search
CPC ................ B60R 1/00; B60R 2300/105; B60R 2300/303; G06T 2207/10024;
(Continued)

(56) References Cited

U.S. PATENT DOCUMENTS 9,509,909 B2 11/2016 Liu et al.
2012/0002050 A1 1/2012 Taniguchi et al.
(Continued)

FOREIGN PATENT DOCUMENTS

| CN | 106254844 A | 12/2016 |
|---|---|---|
| DE | 102013211650 A1 | 12/2014 |

(Continued)

OTHER PUBLICATIONS

International Search Report for PCT/EP2019/066165, dated Sep. 26, 2019.

*Primary Examiner* — Farzana Hossain
(74) *Attorney, Agent, or Firm* — Norton Rose Fulbright US LLP; Gerard Messina

(57) ABSTRACT

A method, including recording a first and a second camera image; the first camera image and the second camera image having an overlap region. The method includes: assigning pixels of the first camera image and pixels of the second camera image to predefined points of a three-dimensional lattice structure, the predefined points being situated in a region of the three-dimensional lattice structure, which represents the overlap region; ascertaining a color information item difference for each predefined point as a function of the assigned color information items; ascertaining a quality value as a function of the ascertained color information item difference at the specific, predefined point; determining a global color transformation matrix as a function of the color information item differences, weighted as a function of the corresponding quality value; and adapting (Continued)

the second camera image as a function of the determined color transformation matrix.

10 Claims, 4 Drawing Sheets

(51) Int. Cl.
*G06T 7/90* (2017.01)
*H04N 5/225* (2006.01)
*B60R 1/00* (2022.01)
*H04N 7/18* (2006.01)
*H04N 9/67* (2006.01)

(52) U.S. Cl.
CPC ......... *H04N 5/22525* (2018.08); *H04N 7/181* (2013.01); *H04N 9/67* (2013.01); *B60R 2300/105* (2013.01); *B60R 2300/303* (2013.01); *G06T 2207/10024* (2013.01); *G06T 2207/10028* (2013.01); *G06T 2207/30252* (2013.01)

(58) Field of Classification Search
CPC . G06T 2207/10028; G06T 2207/30252; G06T 7/55; G06T 7/90; H04N 1/3876; H04N 13/133; H04N 13/15; H04N 13/239; H04N 13/243; H04N 13/246; H04N 2013/0077; H04N 5/22525; H04N 5/23238; H04N 7/181; H04N 9/67; H04N 9/76
See application file for complete search history.

(56) References Cited

U.S. PATENT DOCUMENTS

2015/0138312 A1   5/2015   Liu et al.
2017/0166126 A1   6/2017   Sypitkowski

FOREIGN PATENT DOCUMENTS

DE   102016121755 A1   5/2018
EP   2629506 A1   8/2013
EP   2846532 A1   3/2015

METHOD FOR DISPLAYING A MODEL OF A SURROUNDING AREA, CONTROL UNIT AND VEHICLE

FIELD

The present invention relates to a method for displaying a model of a surrounding area of a reference object, a control unit for carrying out the method, as well as a vehicle having the control unit.

BACKGROUND INFORMATION

U.S. Pat. No. 9,509,909 B2 describes a method for displaying a model of a surrounding area of a vehicle as a function of a plurality of wide-angle cameras, which are situated on a vehicle.

An object of the present invention is to improve a method for displaying a model of a surrounding area of a reference object.

SUMMARY

The above-mentioned object may be achieves in accordance with example embodiments of the present invention.

The present invention relates to a method for displaying a model of a surrounding area of a reference object, in particular, of a vehicle as a reference object; the method being carried out advantageously during the operation of the vehicle. For example, the method is carried out during a parking operation of the vehicle. Alternatively, the reference object may also be a building; for example, the method is carried out to support monitoring of the building. More realistic color perception of the displayed model of the surrounding area of the reference object advantageously results from the method.

In accordance with an example embodiment of the present invention, the method for displaying a model of the surrounding area of a reference object includes recording a first camera image with the aid of a first camera, and recording a second camera image with the aid of a second camera; the first camera image and the second camera image having an overlap region. The first camera and/or the second camera advantageously have a wide-angle lens system. Each of the first and second camera images further includes a plurality of pixels, each having a color information item, such as a color code and/or a chrominance, or a brightness value, that is, a luminance. The color information item may include, for example, three parameters, such as a red value, a green value and a blue value. The first and/or second camera image may optionally be preprocessed in a method step, after the acquisition of the first and/or second camera image. This optional preprocessing includes, for example, linearization as a function of a camera characteristic curve or tone mapping, and/or gamma correction and/or compensation for camera-specific image artifacts. Image artifacts include, for example, vignetting, that is, darkening in edge regions of the first and/or second camera image. This optional preprocessing advantageously takes place only at predefined points and/or in the vicinity of the predefined points. In a subsequent step, pixels of the first camera image and the pixels of the second camera image are assigned at least to predefined points of a three-dimensional lattice structure according to an assignment rule specified in each instance; the predefined points being situated in a region of the three-dimensional lattice structure, which represents the overlap region of the first and second camera images. In this context, the predefined points are advantageously positioned uniformly in this region of the three-dimensional lattice structure. More than one hundred predefined points are advantageously provided in the region of the lattice structure, which represents the overlap region. The specified assignment rule is, for example, a lookup table, which is also advantageously configured to eliminate distortion in camera images that are acquired with the aid of the wide-angle lens system. The predefined points of the lattice structure are each assigned a color information item of the first camera image and the second camera image. In other words, a predefined point is assigned, in each instance, a first color information item of the first camera image and a second color information item of the second camera image. Subsequently, for each predefined point of the three-dimensional lattice structure, a color information item difference is ascertained as a function of the respectively assigned color information items of the first and second camera images, that is, as a function of the first color information item assigned there and the second color information assigned there. In other words, the color information item differences at a stipulated selection of coordinates, that is, predefined points of the lattice structure, are ascertained. After that, a quality value is ascertained at each predefined point for this respective, predefined point, as a function of the ascertained color information item difference at the respective, predefined point. High quality values represent, for example, good agreement of the color information item between the respective pixels of the first and the second camera images. Low quality values represent, for example, distortion or masking in the image. In a further step, a global color transformation matrix is determined as a function of the ascertained plurality of color information item differences at the predefined points; the color information item differences each being weighted as a function of the ascertained quality value of the respective, predefined point. Consequently, for example, color information item differences having a quality value below a threshold value are not considered for determining the global color transformation matrix. In this manner, in order to ascertain the global color transformation matrix, color information item differences of predefined points of the lattice structure are advantageously not taken into account, if the respective, predefined points lie, for example, in distorted image regions, or in saturated (that is, highly overexposed or highly shaded) regions. Subsequently, the second camera image is adapted, in particular, to the first camera image in at least part of a region as a function of the determined color transformation matrix. This may produce the advantage that the color information items of the second camera image are harmonized with, or adapted to, the color information items of the first camera image, using little computational time. In a further step of the method, the model of the surrounding area of the reference object is displayed as a function of the three-dimensional lattice structure, at least a subregion of the first camera image, and at least a subregion of the adapted, second camera image. Owing to the example method, the color information items are harmonized between the acquired, first and second camera images, which means that a user has the impression that the displayed model is realistic and is recorded from a common perspective, and that displayed color and brightness characteristics are realistic. The three-dimensional lattice structure allows the predefined points to be situated in a three-dimensional region of the lattice structure, that is, not only in the flat ground region of the lattice structure, which means that the color harmonization and/or the adaptation between the two camera images is improved considerably, since, for example, large and uniform celestial surfaces of the first and second camera images are taken into account for calculating the color transformation matrix. In addition, the use of the quality value or quality measure precludes the color transformation matrix from being generated as a function of image regions of the camera images, which represent shaded objects and/or objects distorted in the lattice structure, in the surrounding area of the reference object.

In one preferred embodiment of the present invention, the method includes acquiring data regarding the distance between the reference object and objects in the surrounding area of the reference object; the distance data also being able to include information regarding height. The distance data are advantageously acquired, for example, with the aid of at least a mono camera, using a structure-from-motion method, with the aid of a stereo camera, with the aid of ultrasonic sensors, with the aid of radar sensors, and/or with the aid of lidar sensors. Different types of sensors may be used simultaneously or successively for acquiring the distance data. Alternatively, or in addition, at least portions of the distance data may be loaded from an electronic storage device; the electronic storage device being able to be situated, in particular, in a server device. Alternatively or additionally, the distance data may be loaded, for example, from a map and/or from a vehicle model; the distance data being able to be stored in the electronic storage device. Subsequently, a three-dimensional lattice structure is generated and/or adapted as a function of the acquired distance data. The generated and/or adapted lattice structure advantageously represents the distances between the reference object and objects in the surrounding area of the reference object. In this embodiment, the model of the surrounding area is displayed additionally as a function of the adapted, three-dimensional lattice structure. In this manner, distortions, which are based on nearby objects in the surrounding area of the reference object, are minimized, and the display becomes more realistic, in particular, if the reference object moves.

In one preferred further refinement of the present invention, the quality value is additionally ascertained and/or the global color transformation matrix is additionally determined as a function of the acquired distance data. For example, the quality value of a predefined point is ascertained additionally as a function of a lateral distance between the associated distance of the predefined point and the reference object and/or as a function of a height information item of the predefined point. In this manner, the predefined points may be selected as a function of distance for determining the color transformation matrix. For example, predefined points closely spaced, for example, less than 1 meter, and/or having a height less than 0.3 meters, and/or at a distance away from each other, for example, greater than 5 meters, and/or having a height of less than 0.3 meters, are not taken into account for determining the color transformation matrix.

In one particularly preferred further refinement of the present invention, only predefined points of the three-dimensional lattice structure, which lie in a range greater than or equal to a minimum lateral distance and/or less than or equal to a specified lateral distance from the ego object, are taken into account for determining a global color transformation matrix; the minimum distance being, in particular, 1 meter, and the specified distance being, in particular, 5 meters. During the adaptation of the second camera image, this further refinement more effectively harmonizes the color information items between the recorded, first and second camera images, so that a user has the impression that the displayed model is more realistic.

In another embodiment of the method in accordance with the present invention, segments in the first camera image and/or in the second camera image may be detected, in particular, with the aid of at least one neural network. Possible segments include, for example, matching regions in the first and/or second camera image, such as a celestial region and/or a building region and/or a planted region and/or a roadway region. In this embodiment, the quality value is ascertained additionally as a function of the detected segments. Through this example embodiment, predefined points, such as the predefined points in the celestial region, are weighted higher, that is, taken more into consideration, via the quality value, in a region and/or segments of the first and second camera images particularly suitable for determining the color transformation matrix. This allows the second camera image to be adapted for an observer in a particularly effective manner. This means that using this embodiment, the color information items of the pixels of the second camera image are brought more into line and/or harmonized with the color information items of the pixels of the first camera image, so that color information items in the displayed model of the surroundings and/or in a common view of the first and second camera images are realistic to an observer.

In a further embodiment of the present invention, the color information item difference and/or the quality value are ascertained additionally as a function of a plurality of color information items of the first and/or second camera images in a surrounding area of the specific, predefined point. Using this embodiment, variances of the color information items in a region about the predefined points are advantageously taken into account for ascertaining the quality value, so that, for example, color noise at the predefined points has a less marked influence on the ascertained quality value. In this manner, the color information of the second camera image is adapted highly effectively to that of the first camera image.

Preferably, the color information item difference and/or the quality value are ascertained additionally as a function of a plurality of color information items of the first and/or second camera images along at least a region of an epipolar line of the specific, predefined point. The epipolar line is produced as a function of the first camera image and the second camera image; that is, the epipolar line is fixed on the basis of an installation position and/or calibration of the first and second cameras. To ascertain the quality value, this embodiment advantageously takes color information items in a region of possible distortion around the predefined points into account, so that, for example, a predefined point, at which, e.g., no distance measurement or only one inaccurate distance measurement is available, only has a marked effect on the determination of the color transformation matrix, if the maximum variance of the color information items along the associated epipolar line in the first and/or second camera image is small. Through this embodiment, pixels in the mostly sunny sky or on untextured walls, which are relevant to the determination of the color transformation matrix, are highly weighted in the determination of the color transformation matrix. This variant further produces the advantage that after the adaptation of the second camera image, the color information items are harmonized particularly effectively between the first and second camera images, in particular, when no distance data or poor distance data are present.

In one embodiment of the present invention, the display of the common model in the overlap region may also include the first camera image or the adapted, second camera image or a combination of the first and second camera images. In other words, in this embodiment, no simple averaging between the first and the second camera image is carried out, which means that the displayed model of the surrounding area of the reference object is represented with fewer visible instances of distortion, and therefore, more realistically.

In the example method, at least one third and one fourth camera image having specific overlap regions with respect to the first camera image or to the second camera image, are additionally recorded about the reference object, so that, in particular, a surrounding area 360° around the reference object is monitored; the third camera image and the fourth camera image being adapted by two additional, specific color transformation matrices, respectively.

The present invention also relates to a control unit for implementing the method(s) according to the present invention.

Furthermore, the present invention relates to a vehicle including the control unit according to the present invention.

Further advantages are derived from the following description of exemplary embodiments with reference to the figures.

DETAILED DESCRIPTION OF EXAMPLE EMBODIMENTS

Figure 1:
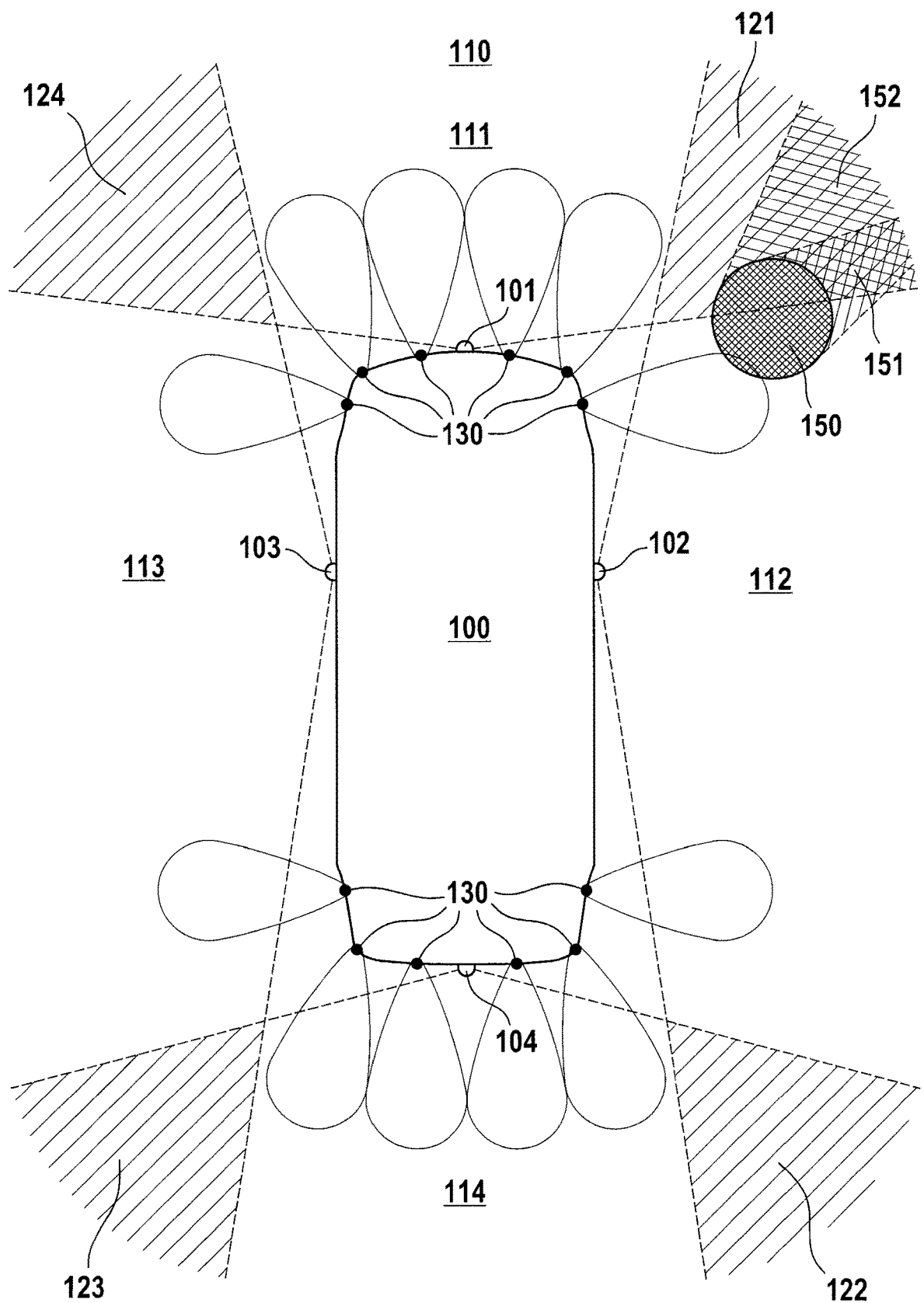
FIG. 1 shows a vehicle having four wide-angle cameras.

In FIG. 1, a vehicle is represented as a reference object 100. Reference object 100 includes a plurality of ultrasonic sensors in the form of distance sensors 130, which, in this example, are situated at the front end and at the rear end of reference object 100. Alternatively, or in addition, at least a stereo camera, a radar sensor and/or a lidar sensor may be positioned on reference object 100 as distance sensors 130. Reference object 100 further includes four wide-angle cameras 101 through 104, which each cover a subregion of a surrounding area 110 of reference object 100. Viewed from reference object 100, a first camera 101 covers a front surrounding-area region 111 of vehicle 100 in the form of a first camera image, a second camera 102 covers a right surrounding-area region 112 of vehicle 100 in the form of a second camera image, a third camera 103 covers a left surrounding-area region 113 of vehicle 100 in the form of a third camera image, and a fourth camera 104 covers a rear surrounding-area region 114 of vehicle 100 in the form of a fourth camera image. Consequently, the four cameras 101, 102, 103 and 104 completely cover surrounding area 110 of vehicle 100 in unison, that is, 360° around vehicle 100. Front surrounding-area region 111 and right surrounding-area region 112 intersect or overlap in first overlap region 121. Right surrounding-area region 112 and rear surrounding-area region 114 overlap in second overlap region 122. Front surrounding-area region 111 and left surrounding-area region 113 overlap in fourth overlap region 124. Left surrounding-area region 113 and rear surrounding-area region 114 overlap in third overlap region 123. During the acquisition of the first, second, third and fourth camera images, these are each adapted separately with regard to a color information item of the specific pixel, for example, with regard to a chrominance or a luminance, so that in spite of a different illumination possibly present in the specific camera image, the situation present in respective surrounding-area region 111, 112, 113 and/or 114 is monitored in detail and represented. Due to this separate and automatic adaptation of the color information item on the part of the hardware, for example, as a function of the illumination situation in surrounding area 110 and/or of a pixel histogram, the first, second, third and fourth camera images differ from each other with regard to the color perception for the observer and/or, in particular, with regard to the color information item of the specific, corresponding pixel in the overlap region. For example, third camera 103 records a left surrounding-area region 113 overexposed by the sun, and fourth camera 104 records a surrounding-area region 114 that is dark due to shading, which means that the third and fourth camera images have highly different color information in overlap region 123. A model, which includes, for example, the third camera image and the fourth camera image, in each instance, without adaptation of at least a subregion of a camera image with regard to the color information, would seem unrealistic and/or complicated to an observer due to the differences in the color information between the camera images at or in overlap region 123, since, for example, the transitions between the third and fourth camera images would be not continuously and/or clearly visible in this case. In the exemplary embodiment from FIG. 1, a three-dimensional object 150 having an object height is present in the surrounding area of reference object 100. Due to this, the first camera image and the second camera image include object 150. In addition, a first region 151 in back of object 150 is not covered by first camera 101, and a second region 152 in back of object 150 is not covered by second camera 102.

Figure 2:
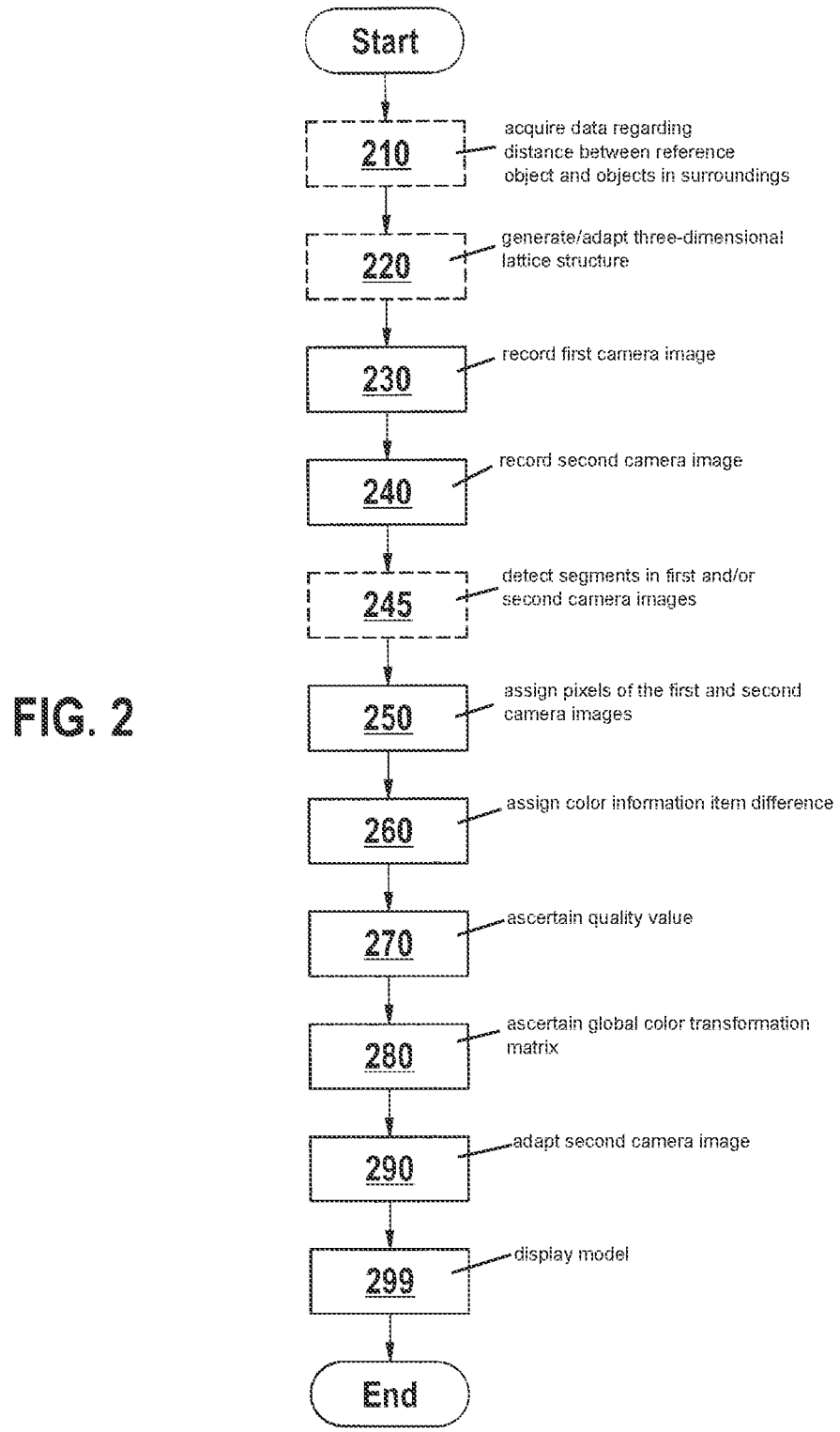
FIG. 2 shows a flow chart of the method in accordance with an example embodiment of the present invention.

The flow chart of the method of the present invention represented in FIG. 2 advantageously minimizes distortion in the display of the model of the surrounding area, which results due to objects 150 in the surrounding area of reference object 100, and harmonizes the differences in the color information between two camera images. In the case of acquisition of more than two camera images, the method may be carried out separately and/or repeatedly for a joint display of adjacent camera images and/or for each overlap region 121, 122, 123 and/or 124. In a display of a surrounding-area model, in spite of a different illumination situation in surrounding-area regions 111, 112, 113 and/or 114, the method produces, for example, a harmonic color information item of the common surrounding-area model, which includes the first through fourth camera images. The color information items are harmonized, in each instance, between two camera images.

According to FIG. 2, initially (step 210), data regarding the distance between reference object 100 and objects 150 in the surrounding area of reference object 100 are optionally acquired with the aid of at least one distance sensor 130; distance sensor 130 preferably including a mono camera, for example, first camera 101, and/or at least one ultrasonic sensor. In optional step 220, a three-dimensional lattice structure is subsequently generated and/or adapted as a function of the acquired distance data. For example, the lattice structure is generated as a function of a three-dimensional point cloud and/or distance data ascertained by a structure-from-motion method as a function of a sequence of camera images. The generated and/or adapted lattice structure represents the spatial and/or three-dimensional distances between reference object 100 and objects 150 in surrounding area 110 of reference object 100. In method step 230, the first camera image is recorded with the aid of first camera 101. In a further step 240, the second camera image is recorded with the aid of second camera 102; the first camera image and the second camera image having overlap region 121. The first camera image and the second camera image each include a plurality of pixels that each have a color information item, such as a brightness value or a color code; in particular, this color information item being set automatically with the aid of the first and/or second camera. In an optional step 241 (not shown), the recorded, first and/or second camera images may be preprocessed at at least predefined points in overlap region 121. In optional step 245, segments in the first and/or second camera images are detected. The segments are detected, for example, using pattern recognition by a neural network. For example, in each instance, a roadway region or a celestial region or an object region in the first and/or second camera image is detected as a segment. In a step 250, for at least predefined points of the three-dimensional lattice structure, the pixels of the first camera image and of the second camera image are assigned, in each instance, according to a specified assignment rule; that is, the camera images are projected onto the lattice structure at at least the predefined points. The predefined points are situated in at least a subregion of the lattice structure, which represents overlap region 121. For example, the predefined points in this subregion of the lattice structure, which represents overlap region 121, are positioned uniformly in a grid. For example, more than one hundred predefined points may be provided. By assigning 250 the pixels of the first camera image and the second camera image to the three-dimensional lattice structure, at least the predefined points of the lattice structure are each assigned a first color information item of a pixel of the first camera image and a second color information item of a pixel of the second camera image. A color information item difference is then ascertained 260 for each predefined point; at a predefined point, the color information item difference being calculated, in each instance, at least as a function of the first color information item assigned there and the second color information item assigned there. In one further refinement, the color information item difference at a predefined point may optionally be ascertained additionally as a function of the color information items of the first and/or second camera image in a surrounding area of the specific, predefined points and/or along at least a region of an epipolar line with respect to the predefined point. In this context, the surrounding area may be defined in different ways, for example, as a matrix, in particular, a 5×5 matrix, as a uniform grid, or as a dot pattern in the surrounding area of the specific, predefined point. Subsequently, at the specific, predefined points, a quality value is further ascertained 270 as a function of the color information item difference calculated for the specific, predefined point. Optionally, the quality value may be ascertained additionally as a function of the color information items of the first and/or second camera images in a surrounding area of the specific, predefined point and/or along at least a region of the epipolar line. The quality value represents a correlation between the first and the second camera image at the predefined point of the three-dimensional lattice structure. Optionally, the quality value is ascertained 270 additionally as a function of the detected segments in the first and/or second camera image. In a further, optional refinement, the quality value at a respectively predefined point is ascertained 270 additionally as a function of the color information items in the surrounding area of the specific, predefined point and/or along the region of the epipolar line associated with the predefined point in the first and/or second camera image. The quality value may further be ascertained 270 additionally as a function of the acquired distance data. In a further step 280, a global color transformation matrix is determined as a function of the ascertained plurality of color information item differences; the ascertained color information item differences each being weighted as a function of the ascertained quality values of the respective, predefined point. In one optional further refinement, in step 280, the global color transformation matrix is determined additionally as a function of acquired distance data. The determination 270 of the quality value or the determination 280 of the color transformation matrix may advantageously take place as a function of predefined points of the three-dimensional lattice structure, which lie in a range greater than or equal to a minimum distance and/or less than or equal to a predefined distance from reference object 100. In step 290, the second camera image is adapted at least in a subregion as a function of the determined color transformation matrix. Subsequently, a model of the surrounding area of reference object 100 is displayed 299 as a function of the three-dimensional lattice structure, at least a subregion of the first camera image, and at least the subregion of the adapted, second camera image. As an option, the model of the surrounding area is displayed additionally as a function of the adapted, three-dimensional lattice structure. In a region, which represents the overlap region, the display of the common surrounding-area model preferably includes the first camera image or the adapted, second camera image or a combination of the first and second camera images. The method may be carried out further, for example, for additional camera images having an overlap region with respect to the first and/or second camera image, so that, for example, a surrounding-area model having harmonized color information results for the reference object 100 from FIG. 1.

Figure 3A:
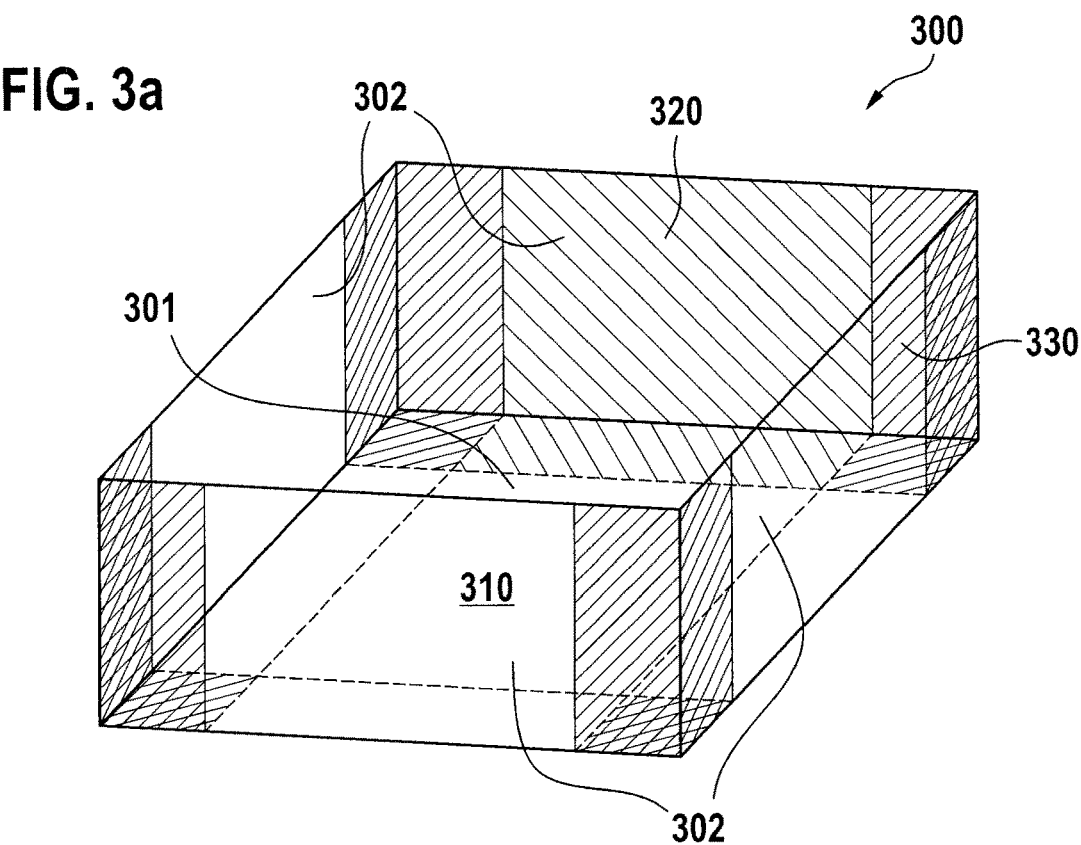
FIG. 3a shows a rectangular, three-dimensional lattice structure.

A rectangular, three-dimensional lattice structure 300 is represented in FIG. 3a. Lattice structure 300 includes a bottom surface 301 and four side faces 302. To display 299 the surrounding-area model, camera images, that is, the first, second, third and/or fourth camera images, are projected onto lattice structure 300, that is, onto bottom surface 301 and onto side faces 302. For example, the first camera image is projected onto region 320 of lattice structure 300, which represents the surrounding-area region 111 covered with the aid of first camera 101, and the second camera image is projected onto the region 330 of lattice structure 300, which represents the surrounding-area region covered with the aid of second camera 102. Subregion 310 of the three-dimensional lattice structure corresponds to the region, in which reference object 100, for example, a vehicle, is situated. Therefore, subregion 310 is not covered by a camera and may be filled up, for example, by a three-dimensional, synthetic model of reference object 100. The display of the surrounding-area model may take place from any desired observer perspective onto three-dimensional lattice structure 300 and, if occasion arises, may be adapted during operation, for example, as a function of acquired distance data, and/or if an object 150 in surrounding area 110 of reference object 100 falls below a distance from reference object 100.

From the perspective of an observer, the display of the surrounding-area model preferably takes place in the direction of travel of reference object 100, from above, at an angle onto three-dimensional lattice structure 300. In one optional embodiment of the present invention, rectangular, three-dimensional lattice structure 300 may be adapted as a function of acquired data regarding the distance between reference object 100 and objects 150 in surrounding area 110 of reference object 100. To that end, for example, regions of three-dimensional lattice structure 300 are adapted, that is, raised and/or deformed, through which these adapted regions of lattice structure 300 represent objects 150.

Figure 3B:
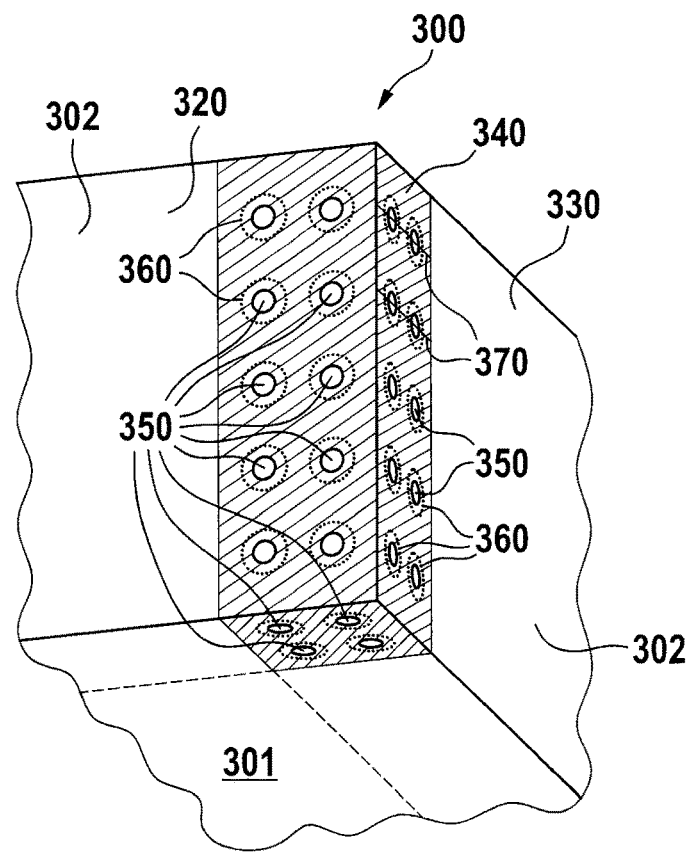
FIG. 3b shows a region of the three-dimensional lattice structure, including predefined points.

In FIG. 3b, the three-dimensional lattice structure 300 from FIG. 3a is shown from a different observer perspective. A region 340 of the three-dimensional lattice structure represents overlap region 121 of the first and second camera images. In this exemplary embodiment, region 340 is situated in a corner region of three-dimensional lattice structure 300. Predefined points 350 are situated in this region 340, which represents overlap region 121. A plurality of predefined points may be provided, for example, a number greater than one hundred. Each predefined point 250 is assigned a color information item of a pixel of the first camera image and a second color information item of a pixel of the second camera image. Consequently, color information item differences between the pixels of the first and second camera images may be determined at predefined points 350. Both bottom surface 301 and side faces 302 have predefined points 350 in region 340, which represents overlap region 121. The predefined points may lie in a region 340 of lattice structure 300 adapted as a function of distance data. In one variant, the quality value may be ascertained and/or the color transformation matrix may be determined as a function of predefined points in a lateral distance range with respect to reference object 100, and/or as a function of predefined points, which have a height greater than a specified height. A difference in the color information item between the first camera image and the second camera image is determined at each of predefined points 350. Subsequently, at each predefined point 350, a quality value for this predefined point is additionally calculated as a function of the color information item difference determined at this predefined point. The color transformation matrix is determined 280 as a function of the ascertained color information item difference of each predefined point 350; the color information item difference of specific, predefined point 350 being weighted as a function of the respective quality value at this predefined point. In further refinements of the present invention, color information item differences in a surrounding area 360 and/or along a region of the epipolar line 370 of specific, predefined point 350 may be determined, and the quality value may be ascertained as a function of the color information item differences determined in surrounding area 360 and/or along the region of the epipolar line 370 of specific, predefined point 350. In a further variant, the color transformation matrix may be determined 280 additionally as a function of the acquired distance data; for example, predefined points 350 being weighted additionally as a function of the distance data.

Figure 3C:
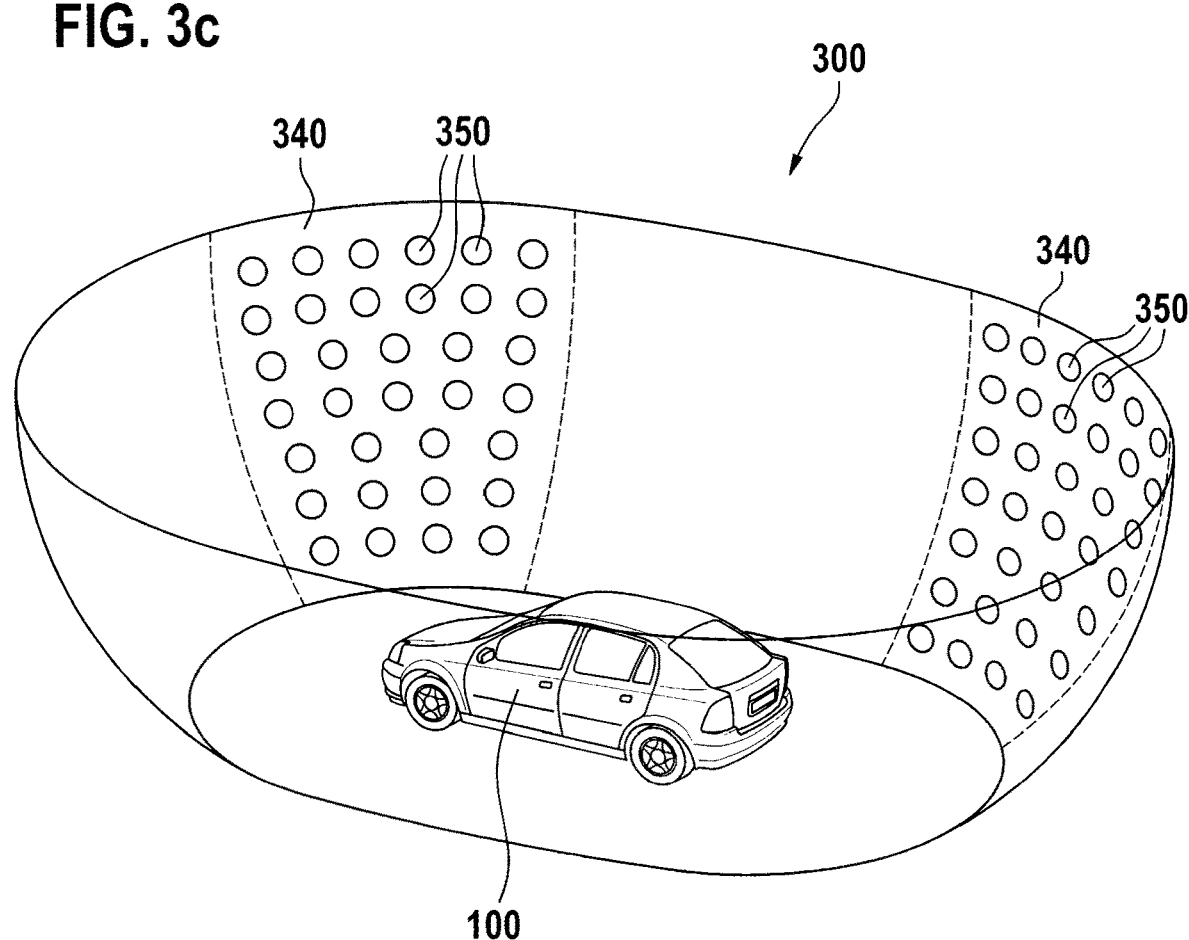
FIG. 3c shows an alternative three-dimensional lattice structure including predefined points.

An alternative, three-dimensional lattice structure 300 having the shape of a tub is represented in FIG. 3c. Reference object 100, in particular, a vehicle, is situated in the middle of tub-shaped lattice structure 300 in the form of a synthetic object. A display 299 of the surrounding-area model may include such a tub-shaped lattice structure 300; the display being able to take place from any observer perspective desired. The camera images may be projected onto tub-shaped lattice structure 300. In each instance, predefined points 350 are situated in regions 340 of tub-shaped lattice structure 300, which represent overlap regions 121, 122, 123, 124 between the camera images. The predefined points of a region 340, which represents an overlap region 121, are each used for ascertaining the color information item differences, as well as for determining the quality values and the color transformation matrix. In one optional embodiment of the present invention, tub-shaped lattice structure 300 may be adapted as a function of acquired data regarding the distance between reference object 100 and objects 150 in surrounding area 110 of reference object 100. To that end, for example, regions of tub-shaped lattice structure 300 are adapted, that is, raised and/or deformed, through which these adapted regions of lattice structure 300 represent objects 150.

Each of the predefined points in the overlap region of two cameras, that is, on the lattice structure, is assigned two color information items, that is, the first color information item of the first camera image and the second color information item of the second camera image. A vector ($\vec{c}$) in the RGB color space (e.g., sRGB,) is taken on as a color information item; the color information item including, for example, individual chromaticity values (red, green and blue). Nonlinear effects, such as camera vignetting (darkening in the edge region of the image) and/or tone mapping, may be present in a camera image. In order to determine the subsequent color transformation matrix, the color information items at the predefined points, that is, the corresponding chromaticity values, may optionally be linearized. If, for example, the camera exhibits significant vignetting, it is advantageous to compensate for this. The vignetting is considered, for example, only one-dimensionally and increases radially, starting from the center of the image, and is approximated effectively, for example, by a 6th-degree polynomial: $f(r)=1+ar^2+br^4+cr^6$, of which the 3 coefficients (a, b, c) must be determined. In this instance, radius r is relative to the center of the image (0.5, 0.5). The input chromaticity values ($\vec{c}_{in}$) in the image may then be corrected:

$$\vec{c}_{out} = \vec{c}_{in} \frac{1}{f(r)}.$$

A camera characteristic curve should be known for the linearization of a camera image. Alternatively, a simple gamma correction is often sufficient: $\vec{c}_{lin}=(\vec{c}_{out})^\gamma$. The parameter gamma ($\gamma$) is often a value between 1.0 and 3.0.

The color transformation matrix (referred to in the following as variable x) may be solved for, e.g., directly, by the method of least squares, as a function of the predefined points and the respective, associated color information items. In this context, the color information items of two pixels of the first and second camera images at a predefined point in the overlap region are set into correspondence: in this context, $\vec{c}_{1,i} \leftrightarrow \vec{c}_{2,i}=(c_{1,i}{}^r,c_{1,i}{}^g,c_{2,i}{}^b)\leftrightarrow(c_{2,i}{}^r,c_{2,i}{}^g,c_{2,i}{}^b)$ is the ith (RGB) color correspondence between two points in the source image (1) and target image (2) at the corresponding pixel positions $p_{1,i} \leftrightarrow p_{2,i}$.

In addition, the quality values in the form of weights (W) are also included in the determination of the color transformation matrix. The problem may then be formulated mathematically as follows:

$$\min_{x} \|WAx - Wb\|_2^2 + \lambda \|Fx - g\|_2^2,$$

where x is the optimum color transformation matrix sought after (for example, a 12-parameter vector), and W is the normalized diagonal matrix including the calculated quality values $w(p_{1,i}, p_{2,i})$. The other variables are defined, for example, as follows:

$$A = \begin{bmatrix} c_{1,0}^r & c_{1,0}^g & c_{1,0}^b & 1 & 0 & 0 & 0 & 0 & 0 & 0 & 0 & 0 \\ c_{1,1}^r & c_{1,1}^g & c_{1,1}^b & 1 & 0 & 0 & 0 & 0 & 0 & 0 & 0 & 0 \\ & & & & & \vdots & & & & & & \\ c_{1,n}^r & c_{1,n}^g & c_{1,n}^b & 1 & 0 & 0 & 0 & 0 & 0 & 0 & 0 & 0 \\ 0 & 0 & 0 & 0 & c_{1,0}^r & c_{1,0}^g & c_{1,0}^b & 1 & 0 & 0 & 0 & 0 \\ & & & & & \vdots & & & & & & \\ 0 & 0 & 0 & 0 & c_{1,n}^r & c_{1,n}^g & c_{1,n}^b & 1 & 0 & 0 & 0 & 0 \\ 0 & 0 & 0 & 0 & 0 & 0 & 0 & 0 & c_{1,0}^r & c_{1,0}^g & c_{1,0}^b & 1 \\ & & & & & \vdots & & & & & & \\ 0 & 0 & 0 & 0 & 0 & 0 & 0 & 0 & c_{1,n}^r & c_{1,n}^g & c_{1,n}^b & 1 \end{bmatrix},$$

$$b = \begin{bmatrix} c_{2,0}^r \\ c_{2,1}^r \\ \vdots \\ c_{2,n}^r \\ c_{2,0}^g \\ \vdots \\ c_{2,n}^g \\ c_{2,0}^b \\ \vdots \\ c_{2,n}^b \end{bmatrix} \text{ and } F = \begin{bmatrix} 1 & & 0 \\ & \ddots & \\ 0 & & 1 \end{bmatrix}_{12 \times 12},$$

$g = [1,0,0,0,0,1,0,0,0,0,1,0]^T.$

The solution of this equation is defined compactly with the aid of the normal equation:

$$x = (A^T A + \lambda * F^T F)^{-1} * (A^T b + \lambda * F^T g) = (A'^T A')^{-1} * (A'^T b')$$

where $$A' = \begin{bmatrix} A \\ \sqrt{\lambda} * F \end{bmatrix}, b' = \begin{bmatrix} b \\ \sqrt{\lambda} * g \end{bmatrix}.$$

Lambda is set, for example, between 0.01 and 1.00. Matrix W is not set up explicitly, but multiplied out directly by matrix A and vector b; that is, the color information items of first camera image $\vec{c}_{1,i}$ and the color information items of second camera image $\vec{c}_{2,i}$ are multiplied directly by the corresponding quality values $w(_{1,i}p_{2,i})$.

For a smoother, flicker-free display (299) of the surrounding-area model, temporal filtering of the calculated color transformation matrix is recommended. For example, the current color transformation matrix ($x_t$) may be averaged exponentially with that from the previous time step ($x_{t-1}$):

$$x_t = a * x + (1-a) * x_{t-1}.$$

A good value for a lies, for example, between 0.1 and 0.5.

The method described by way of example is used for determining the color transformation matrix in the linear RGB color space. Alternatively, the color transformation matrix may be determined in a different color space, such as YUV or CIELAB, or, alternatively, on gray-scale values.

In step 270, quality values may be ascertained in different ways for the method. Color information item differences, that is, incorrect instances of color correspondence between the first and second camera images, for example, color information items at a predefined point, which do not belong to the same object or scene point, are weighted low by a robust quality value, and all others are weighted high. The epipolar quality measure put forward below as a quality value utilizes the available knowledge of the calibration of the cameras upon installation and calculates a variance of the color information along epipolar lines (or curves) in the first and/or second camera image; the specific epipolar line being associated with a predefined point of the lattice structure and/or, of the other respective camera image. These epipolar lines are predetermined on the basis of the cameras that are fixed with respect to each other, and may also be fetched out of the storage device. In step 260 and/or in step 270, along these epipolar lines, in each instance, a corresponding number of color information items (e.g., n=30) are sampled, for example, in the second camera image, for a predefined point, and from these, the variance is determined for each color channel (red, green, blue) and assigned to the corresponding, predefined point. Subsequently, the color difference and/or the quality value is determined as a function of the variance of the color information item along the epipolar line at the respective, predefined point. The quality value for a color channel is calculated, for example, as follows:

$$w(p_1, p_2) = \max\left(\sigma, 1 - s * \sqrt{\frac{1}{n}\sum_{i=0}^{n}\left\{c_2\left(p_2^l + \left(\frac{i}{n}\right)*(p_2^u - p_2^l)\right) - \overline{c_2}\right\}^2}\right),$$

where $p_2^l, p_2^u$ are the starting and ending pixel coordinates of the epipolar line; $\overline{c}_2$ is the average chromaticity value along the epipolar line, s is a scaling factor (e.g., s=8), and σ is the minimum permissible value for the quality value (e.g., 0.05). For fish-eye cameras, the epipolar geometry is not a line, but a curve. However, this may be approximated by two epipolar line segments: $x_2^l \to x_2$ and $x_2 \to x_2^u$ (in place of the tangent $x_2^l \to x_2^u$). The quality value calculated in this manner for a predefined point and for a color channel may be substituted directly into the calculation of the color transformation matrix (as described above).

What is claimed is:

1. A method for displaying a model of a surrounding area of a reference object, comprising the following steps:
   recording a first camera image using a first camera;
   recording a second camera image using a second camera, the first camera image and the second camera image having an overlap region, the first camera image and the second camera image each including a plurality of pixels having, in each instance, a color information item;
   assigning pixels of the first camera image and pixels of the second camera image to at least predefined points of a three-dimensional lattice structure in accordance with, in each instance, a specified assignment rule, the predefined points being situated in a region of the three-dimensional lattice structure, which represents the overlap region;

ascertaining a corresponding color information item difference for each of the predefined points of the three-dimensional lattice structure as a function of the color information items of the pixels, of the first camera image and the second camera image, assigned to the predefined point;
ascertaining a corresponding quality value for each of the predefined points as a function of the ascertained color information item difference at the predefined point;
determining a global color transformation matrix as a function of the ascertained plurality of color information item differences, the ascertained color information item differences each being weighted as a function of the corresponding quality value of the predefined point;
adapting at least one subregion of the second camera image as a function of the determined global color transformation matrix; and
displaying a surrounding-area model of the reference object as a function of the lattice structure, of at least a subregion of the first camera image, and of at least the adapted subregion of the second camera image.

2. The method as recited in claim 1, further comprising the following steps:
acquiring data regarding a distance between the reference object and objects in the surrounding area of the reference object;
adapting the three-dimensional lattice structure as a function of the acquired distance data; and
displaying the surrounding area model additionally as a function of the adapted lattice structure.

3. The method as recited in claim 2, wherein: (i) each of the quality values is ascertained as a function of the acquired distance data and/or (ii) the determined global color transformation matrix is additionally determined as a function of the acquired distance data.

4. The method as recited in claim 3, wherein the determination of the determined global color transformation matrix takes place as a function of color differences of predefined points of the three-dimensional lattice structure which lie in a range which is: (i) greater than or equal to a minimum distance from the reference object, and/or (ii) less than or equal to a specified lateral distance from the reference object.

5. The method as recited in claim 1, further comprising the following steps:
detecting segments in the first camera image and/or in the second camera image;
wherein each of the quality values is ascertained additionally as a function of the detected segments.

6. The method as recited in claim 1, wherein each of the color information item differences is ascertained and/or each of the quality values is ascertained additionally as a function of a plurality of color information items of the first camera image and/or the second camera image in a surrounding area of the corresponding predefined point.

7. The method as recited in claim 1, wherein each of the color information item differences is ascertained and/or each of the quality values is ascertained additionally as a function of a plurality of color information items of the first camera image and/or the second camera image along at least a region of an epipolar line of the corresponding predefined point.

8. The method as recited in claim 1, wherein the display of the model in a region, which represents the overlap region, includes the first camera image or the adapted second camera image or a combination of the first camera image and the second camera image.

9. A system comprising:
a control unit configured to display a model of a surrounding area of a reference object, the control unit configured to:
record a first camera image using a first camera; record a second camera image using a second camera, the first camera image and the second camera image having an overlap region, the first camera image and the second camera image each including a plurality of pixels having, in each instance, a color information item;
assign pixels of the first camera image and pixels of the second camera image to at least predefined points of a three-dimensional lattice structure in accordance with, in each instance, a specified assignment rule, the predefined points being situated in a region of the three-dimensional lattice structure, which represents the overlap region;
ascertain a corresponding color information item difference for each of the predefined points of the three-dimensional lattice structure as a function of the color information items of the pixels, of the first camera image and the second camera image, assigned to the predefined point;
ascertain a corresponding quality value for each of the predefined points as a function of the ascertained color information item difference at the predefined point;
determine a global color transformation matrix as a function of the ascertained plurality of color information item differences, the ascertained color information item differences each being weighted as a function of the corresponding quality value of the predefined point;
adapt at least one subregion of the second camera image as a function of the determined global color transformation matrix; and
display a surrounding-area model of the reference object as a function of the lattice structure, of at least a subregion of the first camera image, and of at least the adapted subregion of the second camera image.

10. A vehicle, comprising:
a control unit configured to display a model of a surrounding area of a reference object, the control unit configured to:
record a first camera image using a first camera;
record a second camera image using a second camera, the first camera image and the second camera image having an overlap region, the first camera image and the second camera image each including a plurality of pixels having, in each instance, a color information item;
assign pixels of the first camera image and pixels of the second camera image to at least predefined points of a three-dimensional lattice structure in accordance with, in each instance, a specified assignment rule, the predefined points being situated in a region of the three-dimensional lattice structure, which represents the overlap region;
ascertain a corresponding color information item difference for each of the predefined points of the three-dimensional lattice structure as a function of the color information items of the pixels, of the first camera image and the second camera image, assigned to the predefined point;

ascertain a corresponding quality value for each of the predefined points as a function of the ascertained color information item difference at the predefined point;

determine a global color transformation matrix as a function of the ascertained plurality of color information item differences, the ascertained color information item differences each being weighted as a function of the corresponding quality value of the predefined point;

adapt at least one subregion of the second camera image as a function of the determined global color transformation matrix; and display a surrounding-area model of the reference object as a function of the lattice structure, of at least a subregion of the first camera image, and of at least the adapted subregion of the second camera image.

* * * * *